United States Patent
Matsui et al.

(10) Patent No.: US 12,488,628 B2
(45) Date of Patent: Dec. 2, 2025

(54) SYSTEM AND METHOD FOR MANAGING A FITTING ROOM

(71) Applicant: TOSHIBA TEC KABUSHIKI KAISHA, Tokyo (JP)

(72) Inventors: Yoshiyuki Matsui, Mishima Shizuoka (JP); Yusuke Sato, Shizuoka Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 18/733,905

(22) Filed: Jun. 5, 2024

(65) Prior Publication Data

US 2025/0166421 A1 May 22, 2025

(30) Foreign Application Priority Data

Nov. 17, 2023 (JP) ................. 2023-196177

(51) Int. Cl.
  *G07C 1/14* (2006.01)
  *G06Q 10/087* (2023.01)
  *G06Q 30/018* (2023.01)
  *G07C 9/29* (2020.01)

(52) U.S. Cl.
  CPC ............ *G07C 1/14* (2013.01); *G06Q 10/087* (2013.01); *G06Q 30/0185* (2013.01); *G07C 9/29* (2020.01); *G07C 2209/08* (2013.01)

(58) Field of Classification Search
  CPC .......... G07C 9/37; E05F 15/73; H04W 4/029; H04W 4/021; G06Q 30/0201; G06Q 10/087; G06Q 30/02; G06F 9/541; G06K 9/00771
  See application file for complete search history.

(56) References Cited

U.S. PATENT DOCUMENTS

| | | | |
|---|---|---|---|
| 2019/0043002 A1* | 2/2019 | King | G07C 9/00174 |
| 2021/0125250 A1* | 4/2021 | Wilhite | G06Q 30/0613 |
| 2022/0132275 A1* | 4/2022 | Hirata | G06Q 30/02 |

FOREIGN PATENT DOCUMENTS

| | | | | |
|---|---|---|---|---|
| WO | WO-2016071562 A1 * | 5/2016 | | G08B 13/2485 |
| WO | 2023/026495 | 3/2023 | | |

* cited by examiner

*Primary Examiner* — Vernal U Brown
(74) *Attorney, Agent, or Firm* — Amin, Turocy & Watson, LLP (57) ABSTRACT

A first reading unit reads member identification information for uniquely identifying each of customers and a second reading unit reads commodity identification information of a commodity carried into the fitting area by the customer and commodity information of a commodity carried out of the fitting area. A collection and storage unit collects and stores, together with date-and-time information, membership information indicated by the member identification information when the customer enters the fitting area in association with commodity information indicated by the commodity identification information at the time of entering, and collects and stores, together with date-and-time information, membership information indicated by the member identification information when the customer exits the fitting area in association with commodity information indicated by the commodity identification information at the time of exiting. A control unit compares, when the customer exits the fitting area, the commodity information.

20 Claims, 8 Drawing Sheets

SYSTEM AND METHOD FOR MANAGING A FITTING ROOM

CROSS-REFERENCE TO RELATED APPLICATION

This application is based upon and claims the benefit of priority from Japanese Patent Application No. 2023-196177, filed on Nov. 17, 2023, the entire contents of which are incorporated herein by reference.

FIELD

Embodiments described herein relate generally to a system and a method.

BACKGROUND

In related art, in a store such as an apparel shop, a fitting room for a customer to fit a commodity thereof may be provided.

Under such a circumstance, there may be a problem of occurrence of misconduct behavior, such as shoplifting or pranks, which takes advantage of the fitting room being a confined space. In addition, there is a problem that it takes time and effort for a store side such as a store clerk to grasp all of entry and exit of the customer into and from the fitting room and carrying of an unpaid commodity by the customer. For this reason, there is a demand for a technique for the store side such as the store clerk to easily grasp and manage the entry and exit of the customer into and from the fitting room, and the carrying of the unpaid commodity by the customer.

DETAILED DESCRIPTION

A problem to be solved is to prevent misconduct behavior of a customer in a store where a fitting room is provided.

A system according to an embodiment includes a first reading unit, a second reading unit, a collection and storage unit, and a control unit. The first reading unit reads member identification information for uniquely identifying a customer who enters a fitting area and a customer who exits the fitting area, respectively. The second reading unit reads at least one piece of commodity identification information at time of entering retained by each wireless tag attached to at least one commodity carried into the fitting area by the customer and at least one piece of commodity information at time of exiting retained by each wireless tag attached to at least one commodity carried out of the fitting area by the customer. The collection and storage unit collects and stores, together with date-and-time information, membership information indicated by the member identification information when the customer enters the fitting area in association with commodity information indicated by the commodity identification information at the time of entering, and collects and stores, together with date-and-time information, membership information indicated by the member identification information when the customer exits the fitting area in association with commodity information indicated by the commodity identification information at the time of exiting. The control unit compares, when the customer exits the fitting area, the commodity information at the time of exiting with the commodity information at the time of latest entering, and performs notification when there is a difference between the time of exiting and the time of entering.

Hereinafter, a system, a program, and a recording medium (computer program product) in which the program is recorded according to the embodiment will be described with reference to the drawings.

The embodiment described below is an embodiment of the system, the program, and the recording medium according to the disclosure, and the disclosure is not limited to the configurations, specifications, and the like thereof. The embodiment described below is an example of application to a point-of-sales (POS) system introduced into a store such as an apparel shop.

Specifically, an information processing system 1 according to the embodiment is a management system configured to manage a fitting history and a purchase history of a commodity related to a customer (member) registered in a member dedicated service related to a store 3 such as an apparel shop.

Figure 1:
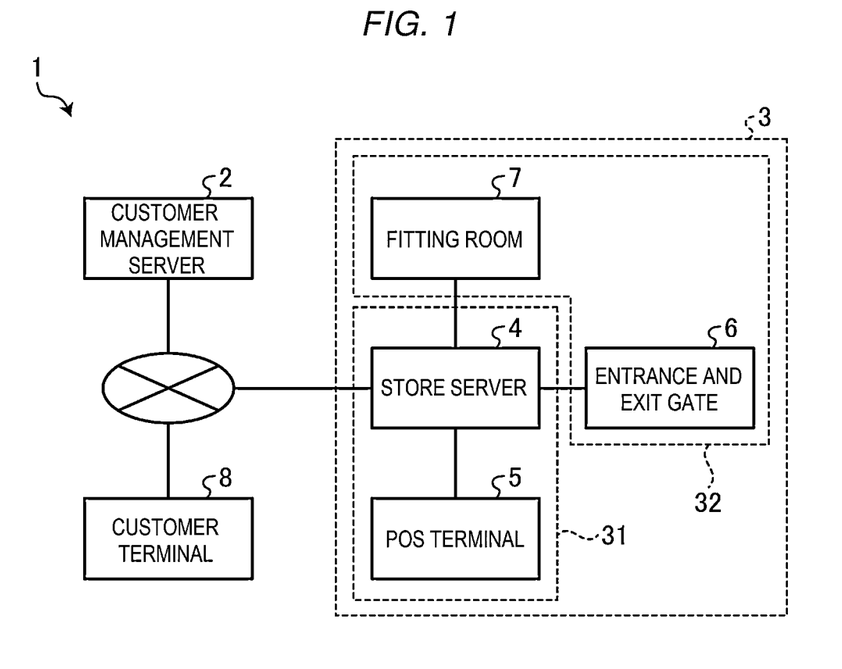
FIG. 1 is a block diagram showing an example of a configuration of an information processing system according to an embodiment.

FIG. 1 is a block diagram showing an example of a configuration of the information processing system 1 according to the embodiment. As shown in FIG. 1, the information processing system 1 includes a customer management server 2, a store server 4, a POS terminal 5, an entrance and exit gate 6, a fitting room 7, and a customer terminal 8.

The store server 4, the POS terminal 5, the entrance and exit gate 6, and the fitting room 7 are provided for each store 3, for example. The number of customer terminals 8 is any number, for example, for each customer.

In the information processing system 1, the customer management server 2 is communicably connected to the store server 4 and the customer terminal 8 via any communication line. As the communication line, the Internet, a virtual private network (VPN), a local area network (LAN), a public communication network, a mobile communication network, and the like can be used alone or in a combination as appropriate.

In the store 3, the store server 4 is communicably connected to the POS terminal 5, the entrance and exit gate 6, and the fitting room 7 via any communication line. Connection therebetween may be wired connection using a dedicated line such as a communication cable, or may be wireless connection. The connection therebetween may also be established via the Internet, a VPN, an public communication network, a mobile communication network, or the like. The connection therebetween may also be established via the customer management server 2.

The customer management server 2 is at least one server apparatus provided on a network such as the Internet, that is, a cloud server provided on a cloud. As an example, the customer management server 2 is provided and operated by an administrator who manages a plurality of stores 3. The customer management server 2 may be provided in the store 3.

Figure 2:
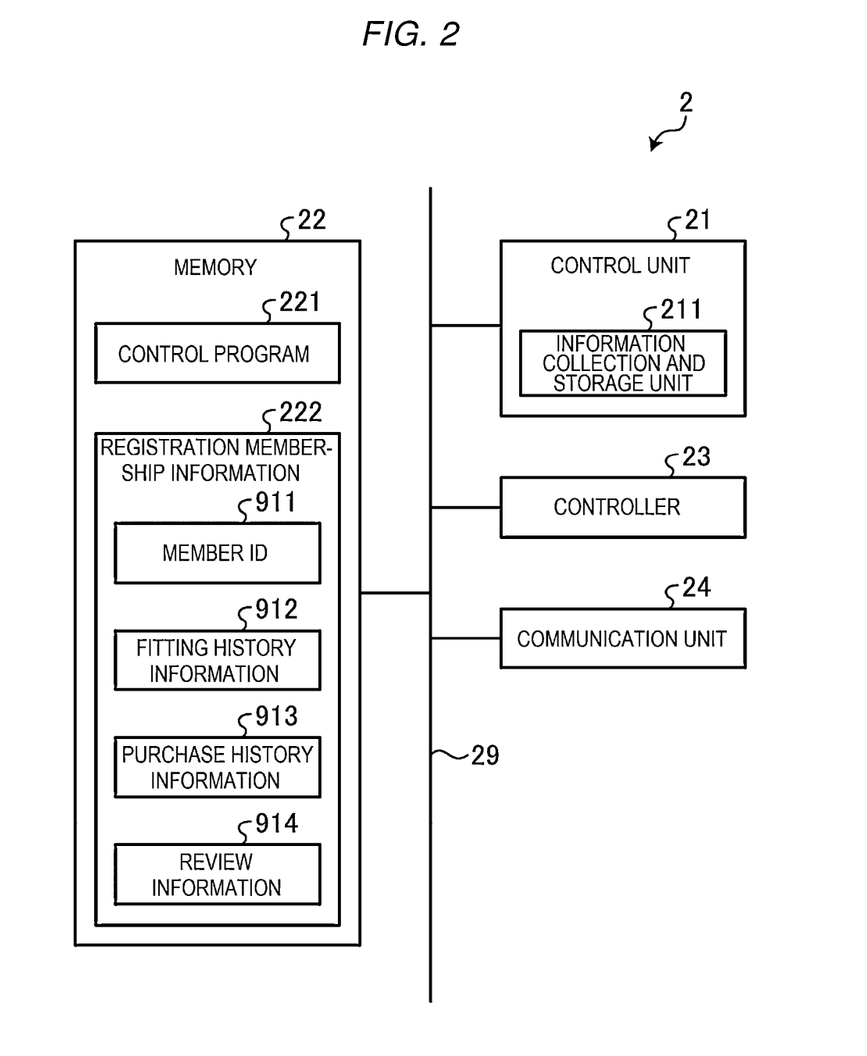
FIG. 2 is a block diagram showing an example of a configuration of a customer management server in FIG. 1.

FIG. 2 is a block diagram showing an example of a configuration of the customer management server 2 in FIG. 1. As shown in FIG. 2, the customer management server 2 includes a control unit 21, a memory 22, a controller 23, and a communication unit 24. The control unit 21, the memory 22, the controller 23, and the communication unit 24 are communicably connected via, for example, a bus 29.

The control unit 21 includes, for example, a processor such as a central processing unit (CPU) and a memory such as a read-only memory (ROM) and a random access memory (RAM), and is implemented similarly to a general purpose computer. For example, the control unit 21 is configured to load various programs stored in the memory such as the ROM or the memory 22 into the RAM of the memory and execute various loaded programs by the processor, thereby implementing each function of the customer management server 2 including an information collection and storage unit 211. Here, the information collection and storage unit 211 of the customer management server 2 according to the embodiment is an example of a collection and storage unit.

The information collection and storage unit 211 collects information related to each customer (member) registered in the member dedicated service and stores the information as registration membership information 222.

As an example, the information collection and storage unit 211 collects, from the store server 4 of each store 3, using member information 423 (see FIG. 3) related to each customer (member) and stores collected history information in association with a member ID 911 of each customer.

For example, the information collection and storage unit 211 receives, from the customer terminal 8 of each customer (member), review information 914 indicating an evaluation of the customer relative to a commodity, and stores the received review information 914 in association with the member ID 911 of each customer. Here, the review information 914 according to the embodiment is an example of evaluation information.

As the processor of the control unit 21, another processor may be provided instead of the CPU or in addition to the CPU. As the other processor, various processors such as a graphics processing unit (GPU) and a digital signal processor (DSP), a dedicated arithmetic circuit implemented by an application-specific integrated circuit (ASIC) or a field-programmable gate array (FPGA) can be used as appropriate.

As the memory of the control unit 21, in addition to the ROM and the RAM, a non-volatile recording medium such as a hard disk drive (HDD), a solid state drive (SSD), or a flash memory can be used as appropriate.

The memory 22 is a storage apparatus including a non-volatile recording medium such as an HDD, an SSD, or a flash memory. The memory 22 stores various programs and various types of data related to an operation of the customer management server 2, a device driver of a device connected to the customer management server 2 via the controller 23, and the like.

As an example, the memory 22 stores a control program 221 and the registration membership information 222. For example, the control program 221 includes at least one program for implementing each functional unit of the customer management server 2. For example, the registration membership information 222 is information related to the customer (member) registered in the member dedicated service related to at least one store 3 managed by the customer management server 2. As shown in FIG. 2, the registration membership information 222 includes the member ID 911, fitting history information 912, purchase history information 913, and the review information 914. In the registration membership information 222, each of the fitting history information 912, the purchase history information 913, and the review information 914 is associated, via the member ID 911 or directly, with at least one piece of other information. In the embodiment, the fitting history information 912 and the purchase history information 913 may be collectively referred to simply as history information.

The member ID 911 is information for uniquely identifying each customer registered in the member dedicated service.

The fitting history information 912 includes commodity information indicating a commodity fitted by each customer and date-and-time information indicating date-and-time of the fitting. The date-and-time information of the fitting is at least one of date-and-time when the customer passes through the entrance and exit gate 6 to be described later for the fitting at the time of entry (entering) and date-and-time when passing through at the time of exit (exiting).

The purchase history information 913 includes commodity information indicating a commodity purchased by each customer and date-and-time information indicating date-and-time of the purchase (sale).

The review information 914 includes information indicating a self-evaluation input in relation to a commodity fitted or purchased by each customer. For example, the review information 914 may be a value (category) input at a plurality of stages (for example, a star rating) or may be a freely input text.

The controller 23 is an input and output interface that connects a device to the customer management server 2.

The communication unit 24 is a communication interface for communicating with the outside of the customer management server 2. The communication unit 24 includes any of a communication circuit for wired communication or a communication circuit for wireless communication, and is connected to the communication line by the communication circuit.

The store server 4 is, for example, at least one server apparatus provided in a back office of the store 3. As an example, the store server 4 is provided and operated by an administrator who manages the store 3 where the store server 4 is provided. The store server 4 is not limited to being provided in the store 3, and may be implemented as a cloud server provided on a cloud. For example, the store server 4 may be integrated with the customer management server 2.

Figure 3:
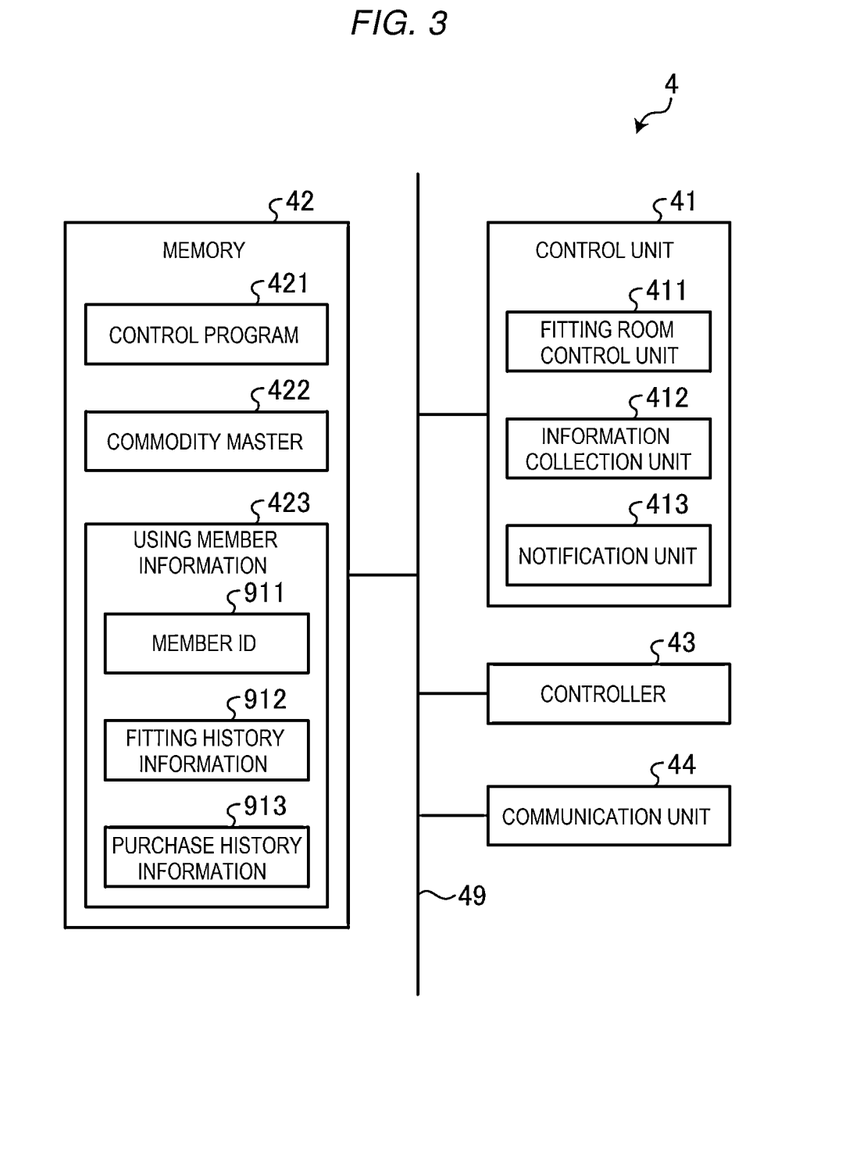
FIG. 3 is a block diagram showing an example of a configuration of a store server in FIG. 1.

FIG. 3 is a block diagram showing an example of a configuration of the store server 4 in FIG. 1. As shown in FIG. 3, the store server 4 includes a control unit 41, a memory 42, a controller 43, and a communication unit 44. The control unit 41, the memory 42, the controller 43, and the communication unit 44 are communicably connected via, for example, a bus 49.

The control unit 41 includes, for example, a processor such as a CPU and a memory such as a ROM and a RAM, and is implemented similarly to a general purpose computer. For example, the control unit 41 is configured to load various programs stored in the memory such as the ROM or the memory 42 into the RAM of the memory and execute various loaded programs by the processor, thereby implementing each function of the store server 4 including a fitting room control unit 411, an information collection unit 412, and a notification unit 413.

The fitting room control unit 411 performs vacancy management for the fitting room 7. For example, the fitting room control unit 411 selects, from vacant rooms among a plurality of rooms (sections) 71 to 74 (see FIG. 6) of the fitting room 7, one room to be provided to the customer according to entry notification (entry data) from the entrance and exit gate 6. Here, the entry notification is information notified of from the entrance and exit gate 6 when the customer enters a fitting area 32 from a commodity display area 31 of the store 3 via the entrance and exit gate 6. The entry data includes the member ID of the customer, the commodity information indicating the commodity carried into the fitting room 7 by the customer, and the date-and-time information indicating the date-and-time. For example, the fitting room control unit 411 notifies the entrance and exit gate 6 of information indicating the selected room, and sets a usage state display lamp 703 (see FIG. 6) of the room to a blinking state. For example, when it is detected that a curtain (or a door) of the room is closed, that is, when start of use of the room by the customer is detected, the fitting room control unit 411 sets the usage state display lamp 703 of the room to an on state. For example, the fitting room control unit 411 sets the usage state display lamp 703 of the room of the fitting room 7 provided to the customer to an off state in response to exit notification (exit data) from the entrance and exit gate 6. Here, the exit notification is information notified of from the entrance and exit gate 6 when the customer exits from the fitting area 32 of the store 3 to the commodity display area 31 via the entrance and exit gate 6. The exit data includes the member ID of the customer, the commodity information indicating the commodity carried out of the fitting room 7 by the customer, and the date-and-time information indicating the date-and-time.

The information collection unit 412 collects sales information from at least one POS terminal 5 provided in the store 3. For example, the information collection unit 412 stores the sales information received from the POS terminal 5, and manages sales of the store using the stored sales information. The information collection unit 412 collects the purchase history information 913 for each customer (member ID 911) based on the sales information for each customer and stores the purchase history information 913 in the memory 22.

The information collection unit 412 collects the fitting history information 912 for each customer (member ID 911) from at least one entrance and exit gate 6 provided in the store 3. As an example, the information collection unit 412 collects the entry notification (entry data) and the exit notification (exit data) from the entrance and exit gate 6 as the fitting history information 912. Here, the information collection unit 412 of the store server 4 according to the embodiment is an example of a collection and storage unit.

The notification unit 413 performs notification (alert) when the commodity information in the exit notification (exit data) does not match the commodity information in latest entry notification (entry data) of the same customer (member ID 911). The alert may be performed by at least one of the store server 4, the POS terminal 5, and the entrance and exit gate 6, or may be performed by another alarm apparatus provided in the store 3 or a mobile terminal carried by the store clerk. The alert may be implemented by outputting a notification sound (warning sound), may be performed by outputting a voice, or may be performed by outputting a display. In the embodiment, the description will be continued with an example in which the alert is performed at the entrance and exit gate 6. Here, the notification unit 413 of the store server 4 according to the embodiment is an example of a control unit.

As the processor of the control unit 41, another processor may be provided instead of the CPU or in addition to the CPU. As the other processor, various processors such as a GPU and a DSP, a dedicated arithmetic circuit implemented by an ASIC or an FPGA can be used as appropriate.

As the memory of the control unit 41, in addition to the ROM and the RAM, a non-volatile recording medium such as an HDD, an SSD, or a flash memory can be used as appropriate.

The memory 42 is a storage apparatus including a non-volatile recording medium such as an HDD, an SSD, or a flash memory. The memory 42 stores various programs and various types of data related to an operation of the store server 4, a device driver of a device connected to the store server 4 via the controller 43, and the like. Here, the information collection unit 412 of the store server 4 according to the embodiment is an example of a collection and storage unit.

As an example, the memory 42 stores a control program 421, a commodity master 422, and the using member information 423. For example, the control program 421 includes at least one program for implementing each functional unit of the store server 4. For example, the commodity master 422 stores the commodity information of each commodity in association with commodity identification information for identifying the commodity. Here, the commodity identification information is, for example, a commodity code indicating the commodity, and may not be the commodity code as long as the commodity identification information is information for identifying the commodity. The using member information 423 is information about the customer (member) registered in the member dedicated service in the store 3 where the store server 4 is provided. As shown in FIG. 3, the using member information 423 includes the member ID (membership information) 911, the fitting history information 912, and the purchase history information 913. In the using member information 423, the fitting history information 912 and the purchase history information 913 are associated with each other via the member ID 911 or directly.

The controller 43 is an input and output interface that connects a device to the store server 4.

The communication unit 44 is a communication interface for communicating with the outside of the store server 4. The communication unit 44 includes any of a communication circuit for wired communication or a communication circuit for wireless communication, and is connected to the communication line by the communication circuit.

The POS terminal 5 is at least one sales data processing apparatus provided in the store 3. The POS terminal 5 can perform at least one of a registration process and a settlement process (collectively referred to as "transaction process") of the commodity purchased in the store 3, for example.

Here, the registration process of the commodity is a process of reading, from the commodity master, the commodity information (a commodity name, a commodity price, and the like) of the commodity identified by a package recognition process or the like and registering the commodity information. The settlement process is a process of displaying a total amount and a tax amount of the commodity related to one transaction in which the commodity is registered, calculating and displaying a coin based on received money received from the customer, a process of dispensing a receipt on which the commodity information and settlement information (a total amount, a received amount, a change amount, and the like) are printed, and the like.

The POS terminal 5 may be a POS terminal where the store clerk performs an operation related to the transaction process, a semi-self-service-type POS terminal where a part of an operation related to the settlement process is performed by the customer, or a self-service-type POS terminal where the customer performs the operation related to the transaction process. The POS terminal 5 may be implemented by a terminal apparatus such as a cart terminal, a tablet personal computer (PC) or a smartphone fixedly or detachably provided on a shopping cart, or a dedicated terminal, may be implemented by a terminal apparatus (store clerk terminal) such as a tablet PC or a smartphone owned by the store clerk, or may be implemented by a terminal apparatus (customer terminal 8) such as a tablet PC or a smartphone owned or rented by the customer. Such terminal apparatuses may function in the same manner as the POS terminal 5 according to the embodiment by executing an installed POS application (program). The POS terminal 5 may be integrated with the customer management server 2 or the store server 4.

Figure 4:
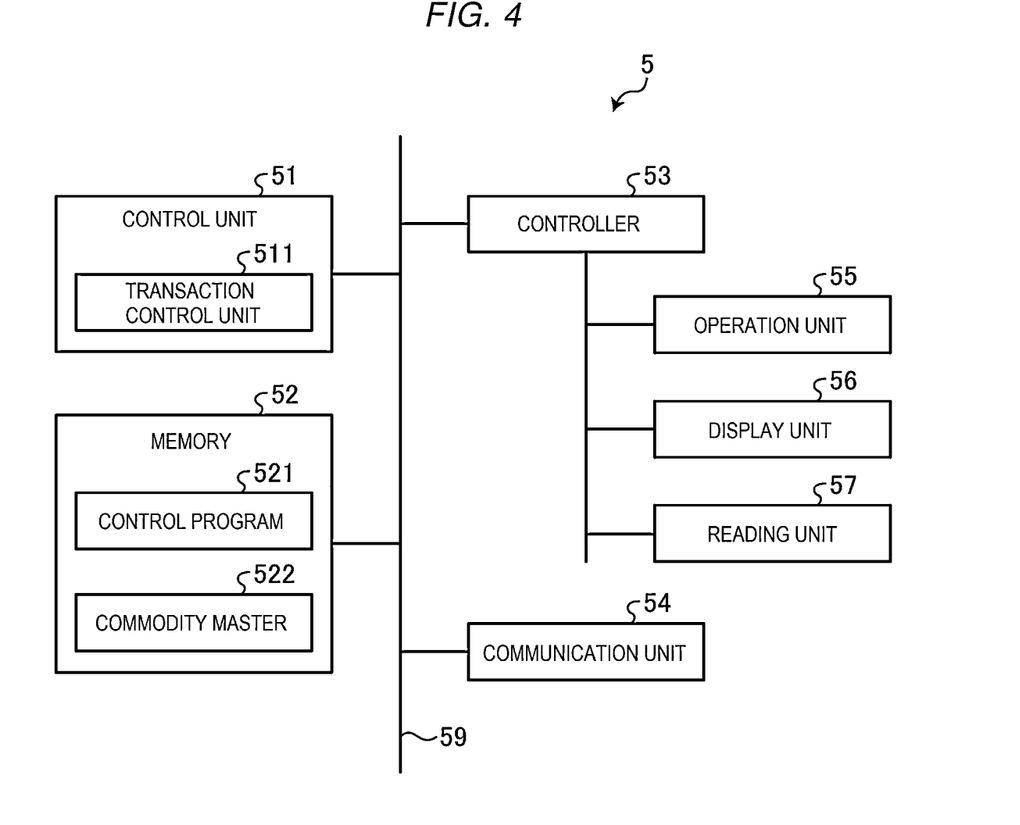
FIG. 4 is a block diagram showing an example of a configuration of a point-of-sales (POS) terminal in FIG. 1.

FIG. 4 is a block diagram showing an example of a configuration of the POS terminal 5 in FIG. 1. As shown in FIG. 4, the POS terminal 5 includes a control unit 51, a memory 52, a controller 53, a communication unit 54, an operation unit 55, a display unit 56, and a reading unit 57. The control unit 51, the memory 52, the controller 53, and the communication unit 54 are communicably connected via, for example, a bus 59. The operation unit 55, the display unit 56, and the reading unit 57 are communicably connected to the controller 53.

The control unit 51 includes, for example, a processor such as a CPU and a memory such as a ROM and a RAM, and is implemented similarly to a general purpose computer. For example, the control unit 51 is configured to load various programs stored in the memory such as the ROM or the memory 52 into the RAM of the memory and execute various loaded programs by the processor, thereby implementing each function of the POS terminal 5 including a transaction control unit 511.

The transaction control unit 511 controls the reading unit 57 to acquire the commodity identification information for identifying the commodity to be read. The transaction control unit 511 performs, based on the commodity identification information of the read commodity, the registration process of registering the commodity. The transaction control unit 511 performs the settlement process for the commodity registered in the registration process and transmits, to the store server 4, the commodity information and the settlement information (that is, the sales information) of the commodity subjected to the settlement process.

The information processing system 1 according to the embodiment may perform the registration process of the commodity on the cart terminal or the customer terminal 8, and may perform the settlement process of the commodity on the POS terminal 5 using a registration result thereof. In this case, the entrance and exit gate 6 may handle the registration result as a commodity carried into the fitting area 32.

The POS terminal 5 according to the embodiment may be a checkout apparatus that can perform the settlement process based on the result of the registration process of the commodity on the cart terminal or the customer terminal 8 among the transaction process. The checkout apparatus may not be capable of performing the registration process of the commodity.

As the processor of the control unit 51 according to the embodiment, instead of the CPU or in addition to the CPU, various processors such as a GPU and a DSP, a dedicated arithmetic circuit implemented by an ASIC or an FPGA can be used as appropriate.

The memory 52 is a storage apparatus including a non-volatile recording medium such as an HDD, an SSD, or a flash memory. The memory 52 stores various programs and various types of data related to an operation of the POS terminal 5, a device driver of a device connected to the POS terminal 5 via the controller 53, and the like.

As an example, the memory 52 stores a control program 521 and a commodity master 522. For example, the control program 521 includes at least one program for implementing each functional unit of the POS terminal 5. The commodity master 522 stores the commodity information of each commodity in association with the commodity identification information for identifying the commodity. Here, the commodity identification information is, for example, a commodity code indicating the commodity, and may not be the commodity code as long as the commodity identification information is information for identifying the commodity.

The controller 53 is an input and output interface that connects a device to the POS terminal 5. In the example in FIG. 4, the operation unit 55, the display unit 56, and the reading unit 57 are connected to the controller 53.

The communication unit 54 is a communication interface for communicating with the outside of the POS terminal 5. The communication unit 54 includes any of a communication circuit for wired communication or a communication circuit for wireless communication, and is connected to the communication line by the communication circuit.

The operation unit 55 is an input interface that receives operation input of a user. The operation unit 55 is, for example, a touch panel that is disposed on a display surface (screen) of the display unit 56 to detect a touch operation of an operator and output a signal to the control unit 51. As an example, the operation unit 55 can receive operation input of the operator on an operation screen displayed on the display unit 56. The operation unit 55 is not limited to a touch panel, and various input devices such as a keyboard, a switch, or a button may be provided as appropriate.

The display unit 56 can display various generated screens under control of the control unit 51. As the display unit 56, various display devices such as a liquid crystal display (LCD) or an organic electro-luminescence (EL) display can be used as appropriate.

The reading unit 57 is an apparatus for acquiring the commodity identification information related to the commodity to be read.

As an example, the reading unit 57 may be an image capturing apparatus (camera) for acquiring the commodity identification information for identifying the corresponding commodity by package recognition of identifying the commodity by capturing an image of a symbol such as a bar code or a two-dimensional code attached to the commodity and analyzing the symbol to identify the commodity, or by recognizing the commodity based on a shape or an appearance of the commodity whose image is captured.

As an example, the reading unit 57 may be a wireless tag reading apparatus for acquiring the commodity identification information for identifying the corresponding commodity by reading tag information from a wireless tag such as a radio frequency identification (RFID) tag attached to the commodity using short-range wireless communication.

As an example, the reading unit 57 may be a scanner for optically reading the symbol such as a bar code or a two-dimensional code attached to the commodity and acquiring the commodity identification information for identifying the corresponding commodity.

As an example, the reading unit 57 may be a communication interface for acquiring the commodity identification information for identifying the corresponding commodity through communication with a commodity shelf or the like that can identify a taken-out commodity by various sensors such as a weight sensor or a camera.

As an example, the reading unit 57 may acquire, via the communication unit 54, the commodity information read by the entrance and exit gate 6, the cart terminal, or the customer terminal 8.

Figure 5:
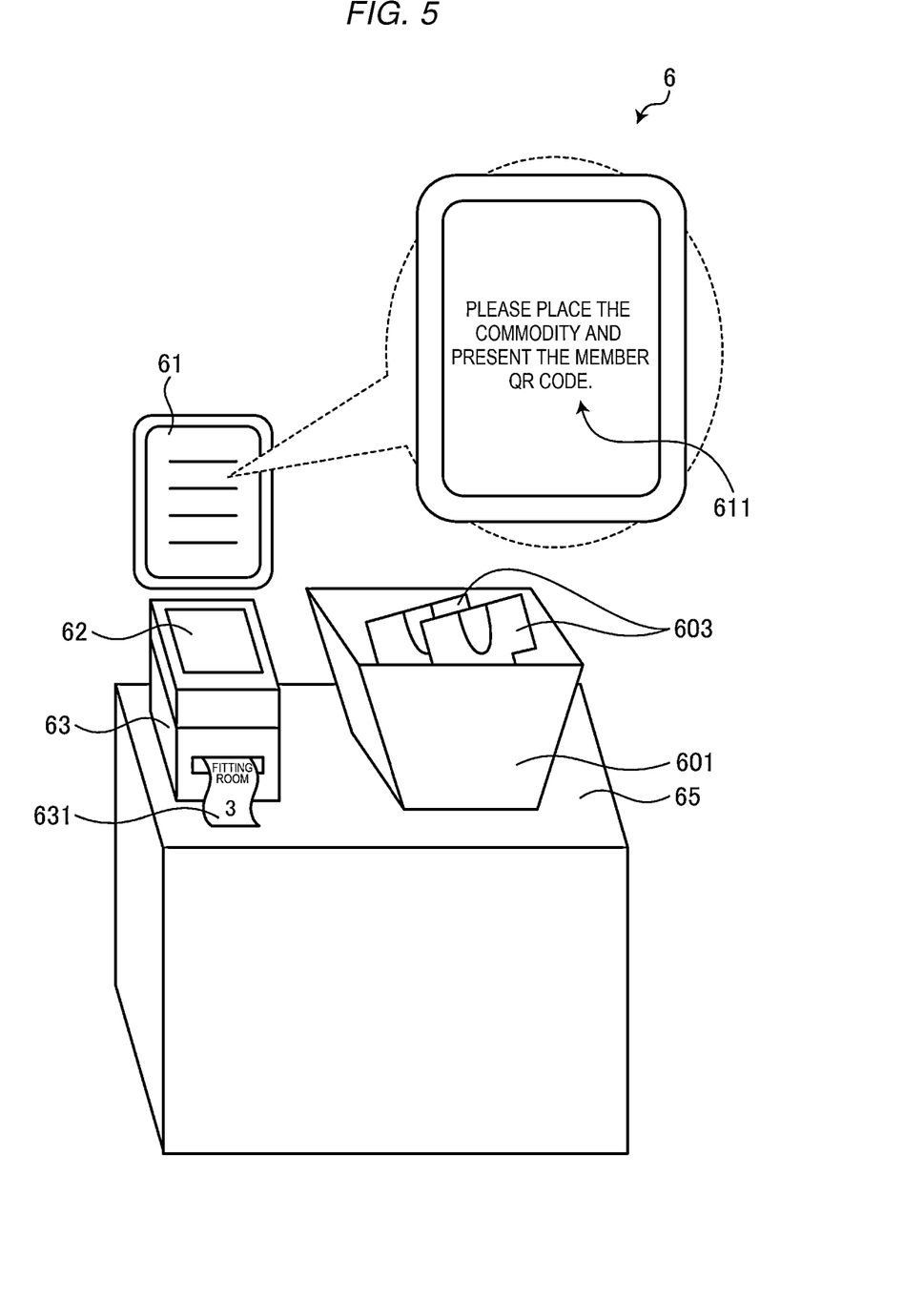
FIG. 5 schematically shows an example of a configuration of an entrance and exit gate in FIG. 1.

The entrance and exit gate 6 is an apparatus provided between the commodity display area 31 and the fitting area 32 in the store 3. FIG. 5 schematically shows an example of a configuration of the entrance and exit gate 6 in FIG. 1. Here, for simplification of description, a case where a customer who enters the fitting area 32 from the commodity display area 31 and a customer who exits from the fitting area 32 to the commodity display area 31 pass through the same side of the entrance and exit gate 6 will be described as an example.

The entrance and exit gate 6 may be implemented as a gate having an entrance gate and an exit gate independent of each other. In this case, the exit gate may not be provided with a receipt printer 63. Alternatively, the entrance gate and the exit gate may be configured to share a part thereof. For example, in the case of a configuration in which a customer who enters the fitting area 32 and a customer who exits the fitting area 32 pass through the same side of the entrance and exit gate 6, the entrance and exit gate 6 may have the configuration shown in FIG. 5. For example, in the case of a configuration in which the customer who enters the fitting area 32 and the customer who exits the fitting area 32 pass through opposite sides via the entrance and exit gate 6, a tablet terminal 61 of the entrance and exit gate 6 may be a common terminal or different terminals as long as the tablet terminal 61 is provided such that a display screen can be visually recognized from each of the customers who pass through both sides (an entrance side and an exit side). For example, the receipt printer 63 of the entrance and exit gate 6 may allow the entering customer to receive a dispensed destination receipt 631. For example, each of a code reader 62 and a reading table 65 of the entrance and exit gate 6 may be shared or may be separately provided as long as each of the code reader 62 and the reading table 65 can be used by each of the customers passing on both sides.

The entrance and exit gate 6 includes the tablet terminal 61, the code reader 62, the receipt printer 63, and the reading table 65. Each of the tablet terminal 61, the code reader 62, the receipt printer 63, and the reading table 65 may be communicable with the store server 4, or communication with the store server 4 may be enabled via any one of these components. The tablet terminal 61, the code reader 62, the receipt printer 63, and the reading table 65 may be integrated.

The tablet terminal 61 displays a procedure instruction of the entrance and exit gate 6 for each customer who enters or exits.

The code reader 62 is an apparatus for reading a membership code displayed on the customer terminal 8. The membership code includes at least information (member identification information) for identifying the member ID 911 of the customer. The membership code may be a bar code, a two-dimensional code, or another image. The membership code is not limited to being displayed on the customer terminal 8, and may be printed or affixed to the membership card. Instead of or in addition to the code reader 62, an apparatus that reads the membership card to which a magnetic tape or an IC chip is attached may be provided. The code reader 62 transmits the read member identification information to the store server 4. At this time, the code reader 62 may transmit, to the store server 4, date-and-time information indicating date-and-time when the member identification information is read. Here, the code reader 62 according to the embodiment is an example of a first reading unit.

The receipt printer 63 dispenses a destination receipt on which a fitting room number of a room specified by the store server 4 among the plurality of rooms 71 to 74 (see FIG. 6) of the fitting room 7 is printed (ticketing notification). The ticketing notification may be performed in a member dedicated application installed on the customer terminal 8 by transmitting information indicating the fitting room number from the receipt printer 63 or the store server 4 to the customer terminal 8.

The reading table 65 is a wireless tag reading apparatus where a shopping basket 601 can be placed by the customer, and which reads tag information from a wireless tag (for example, an RFID tag) attached to a commodity 603 in the placed shopping basket 601 using short-range wireless communication to acquire the commodity identification information for identifying the corresponding commodity. The reading table 65 may read the tag information of the commodity 603 directly placed without using the shopping basket 601. The reading table 65 transmits the read commodity identification information to the store server 4. At this time, the reading table 65 may transmit, to the store server 4, the date-and-time information indicating the date-and-time when the commodity identification information is read. Here, the reading table 65 according to the embodiment is an example of a second reading unit.

The reading table 65 may include an image capturing apparatus (camera) for acquiring the commodity identification information for identifying the corresponding commodity by package recognition of identifying the commodity by capturing an image of a symbol such as a bar code or a two-dimensional code attached to the commodity and analyzing the symbol to identify the commodity, or by recognizing the commodity based on a shape or an appearance of the commodity whose image is captured, or a scanner for optically reading the symbol such as a bar code or a two-dimensional code attached to the commodity to acquire the commodity identification information for identifying the corresponding commodity.

Figure 6:
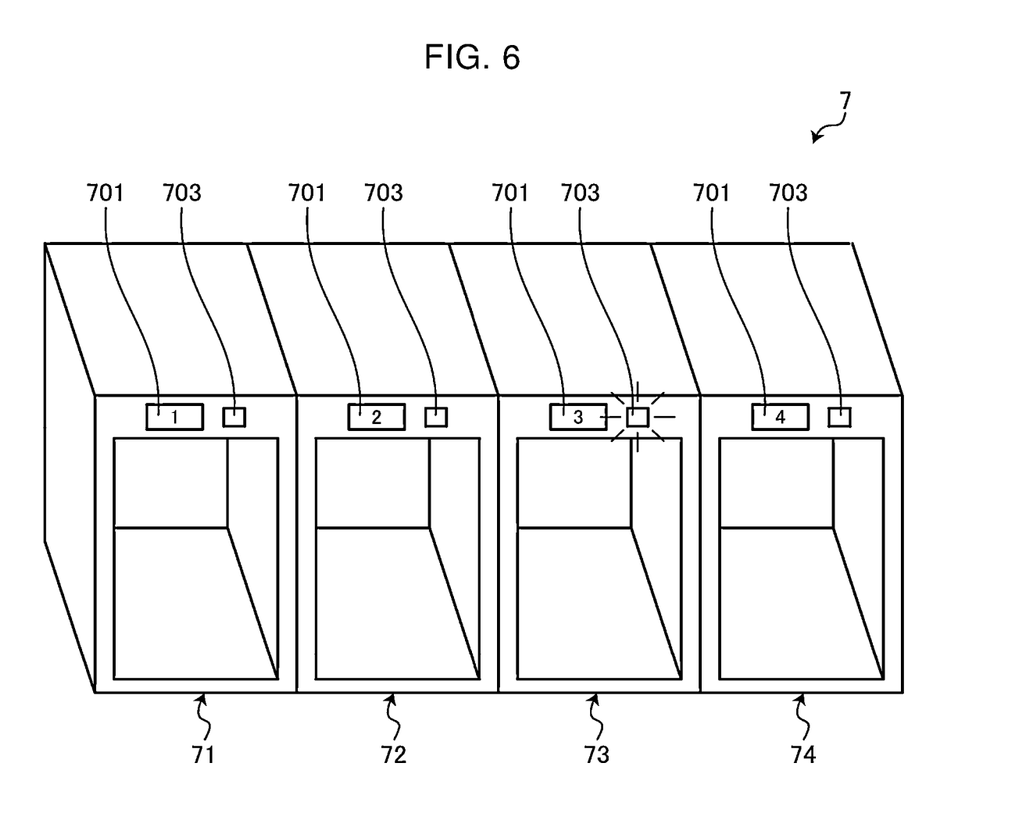
FIG. 6 schematically shows an example of a configuration of a fitting room in FIG. 1.

The fitting room 7 is provided in the fitting area 32 spatially separated from the commodity display area 31 via the entrance and exit gate 6. FIG. 6 schematically shows an example of a configuration of the fitting room 7 in FIG. 1. The fitting room 7 includes the plurality of rooms 71, 72, 73, and 74 for the customer to fit a commodity displayed in the commodity display area 31 of the store 3. FIG. 6 shows a case where four rooms (sections) are provided, but the disclosure is not limited thereto. The number of rooms (sections) may be any number, there may be one room, or may be two, three, or four or five or more rooms.

Each of the rooms 71 to 74 of the fitting room 7 is provided with a fitting room number display 701 and the usage state display lamp 703. The fitting room number display 701 may be any information through which the room can be uniquely identified, and in the example in FIG. 6, numbers 1 to 4 are assigned to the rooms 71 to 74. The usage state display lamp 703 is a display lamp indicating a usage state of each of the rooms 71 to 74.

The usage state display lamp 703 can change a lighting mode thereof according to a status change request from the store server 4. For example, when the room is not in use, the usage state display lamp 703 is in the off state. For example, when the customer is being guided to the room, the usage state display lamp 703 is in the blinking state. For example, the usage state display lamp 703 is in the on state when the room is being used by the customer. The lighting mode of the usage state display lamp 703 is not limited to blinking, on, and off, and the usage state may be indicated by a color, a text, or an icon.

A detection sensor (not shown) is provided in each of the rooms 71 to 74 of the fitting room 7. The detection sensor can detect that a door or a curtain (not shown) provided in each of the rooms 71 to 74 is in a closed state or an opened state, or detect an open-or-closed state thereof.

The customer terminal 8 is a mobile terminal (information processing terminal) used by the customer who uses the member dedicated service related to the store 3. As the customer terminal 8, any information processing terminal such as a smartphone or a tablet terminal can be used as appropriate. As an example, a member dedicated application (application program) for using the member dedicated service related to the store 3 is installed on the customer terminal 8, and the processor of the customer terminal 8 executes the member dedicated application to display a screen including the membership code, display a screen including a purchase history and/or a fitting history, receive customer input of information (review information 914) about an individual evaluation related to a commodity in the purchase history and/or the fitting history, and transmit the received review information 914 to the customer management server 2. The customer terminal 8 may provide the above-described functions to the customer using a web browser.

Hereinafter, an operation example of the information processing system 1 having the above-described configuration will be described with reference to the drawings.

Figure 7:
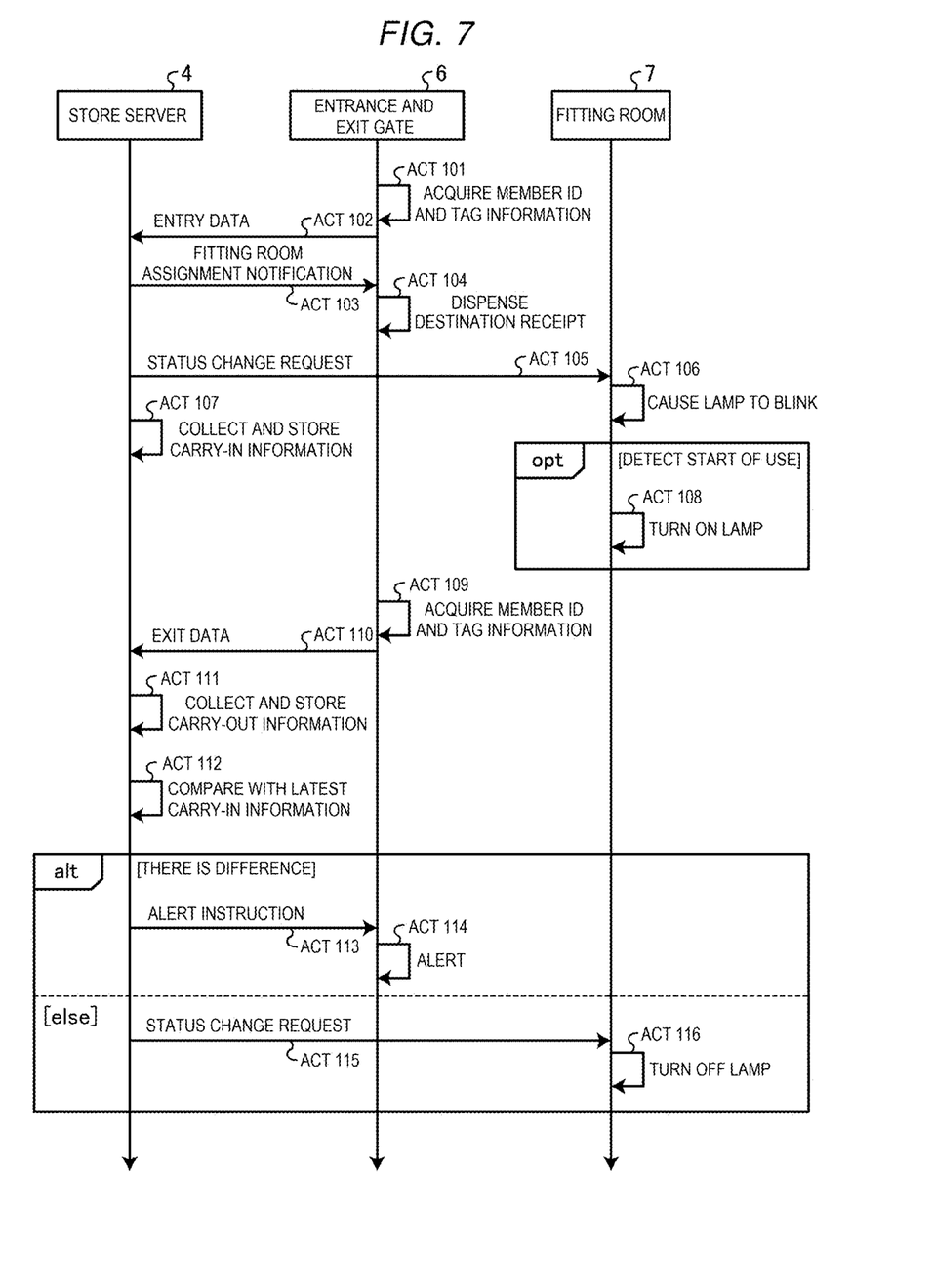
FIG. 7 is a sequence diagram showing an example of a flow of a fitting and selling process in the information processing system.

FIG. 7 is a sequence diagram showing an example of a flow of a fitting and selling process in the information processing system 1 according to the embodiment. The flow of the process in FIG. 7 is merely an example, and addition, deletion, and order change of acts may be performed as desired.

The flow in FIG. 7 is started, for example, when the customer visits the entrance and exit gate 6 provided at an entrance to the fitting area 32 in order to carry the commodity 603 displayed in the commodity display area 31 in the store 3 into the fitting room 7 and fit the commodity 603.

First, the tablet terminal 61 of the entrance and exit gate 6 performs a guidance display 611 (see FIG. 5) including guidance for reading the membership code and guidance for placing the commodity 603 carried into the fitting room 7 on the reading table 65. The customer places, on the reading table 65, the commodity 603 to be fitted according to a procedure of the guidance display 611 displayed on the tablet terminal 61, and presents the membership code displayed in the member dedicated application of the customer terminal 8 to the code reader 62. At this time, the reading table 65 of the entrance and exit gate 6 reads the tag information of the placed commodity 603 and acquires the commodity identification information of the placed commodity 603. In other words, the reading table 65 acquires at least one piece of commodity identification information at the time of entering retained by each wireless tag attached to at least one commodity 603 carried into the fitting area 32 by the customer. The code reader 62 reads, for example, the membership code displayed on the customer terminal 8 to acquire the member identification information (ACT 101). The entrance and exit gate 6 transmits, to the store server 4, the acquired commodity identification information and the acquired member identification information as the entry data together with the date-and-time information indicating date-and-time (ACT 102). The store server 4 acquires the commodity identification information and the member identification information from the entrance and exit gate 6, and acquires, based on the commodity master 422 and the using member information 423, the member ID 911 of the customer and the commodity information indicating at least one commodity 603 carried into the fitting area 32 by the customer.

Thereafter, the store server 4 selects one vacant room among the plurality of rooms 71 to 74 based on information about the vacancy management of the fitting room 7, and transmits fitting room assignment notification indicating the selected room to the entrance and exit gate 6 (ACT 103). In response to the fitting room assignment notification from the store server 4, the entrance and exit gate 6 dispenses the destination receipt 631 where the fitting room number is printed by the receipt printer 63 (ticketing notification) (ACT 104). Accordingly, the fitting room number is further associated with the member ID 911, and is collected and stored in the store server 4.

The store server 4 transmits the fitting room assignment notification to the entrance and exit gate 6 and transmits, to the entrance and exit gate 6, a status change request for changing the usage state display lamp 703 of the selected room to the blinking state (ACT 105). The usage state display lamp 703 of the fitting room 7 starts blinking in response to the status change request from the store server 4 (ACT 106). Accordingly, the customer is guided to the corresponding room of the fitting room 7 with reference to the fitting room number indicated on the destination receipt 631 and the blinking of the usage state display lamp 703, and enters the room.

When the detection sensor provided in the fitting room 7 detects that the door or the curtain is closed, the usage state display lamp 703 of the fitting room 7 determines that use of the room is started, and the usage state display lamp 703 is shifted from the blinking state to the on state indicating a usage state of being in use.

The store server 4 associates, with the member ID 911, a set of contents of the carried-in commodity, and collects and stores, as the using member information 423, the contents together with the date-and-time information (ACT 107).

The store server 4 may notify (inform) the store clerk by the store clerk terminal or the entrance and exit gate 6 when the number of carried-in commodities exceeds a predetermined threshold value of the number of commodities depending on a rule of the store 3 or the like. It is assumed that the threshold value of the number of commodities is stored again in the memory 42, for example. According to this configuration, it is possible to reduce time and effort for the store clerk to check the commodity carried into the fitting area 32 by the customer each time.

When the fitting is finished, the customer returns to the commodity display area 31 again. At this time, the tablet terminal 61 of the entrance and exit gate 6 performs a guidance display including guidance for reading the membership code and guidance for placing the commodity 603 carried out of the fitting room 7 on the reading table 65, similarly to the guidance display 611 at the time of entering. The customer places the fitted commodity 603 on the reading table 65 according to the procedure of the guidance display 611 displayed on the tablet terminal 61 and presents the membership code displayed in the member dedicated application of the customer terminal 8 to the code reader 62. Accordingly, the reading table 65 of the entrance and exit gate 6 acquires the member identification information and the commodity identification information related to the carried-out commodity in the same manner as that at the time of entering (ACT 109). In other words, the reading table 65 acquires at least one piece of commodity identification information at the time of exiting retained by each wireless tag attached to at least one commodity 603 carried out of the fitting area 32 by the customer. The entrance and exit gate 6 transmits, to the store server 4, the acquired commodity identification information and the acquired member identification information as the exit data together with the date-and-time information indicating date-and-time (ACT 110). The store server 4 acquires the commodity identification information and the member identification information from the entrance and exit gate 6, and acquires, based on the commodity master 422 and the using member information 423, the member ID 911 of the customer and the commodity information indicating at least one commodity 603 carried out of the fitting area 32 by the customer.

The store server 4 associates, with the member ID 911, a set of contents of the carried-out commodity, and collects and stores, as the using member information 423 in the store server 4, the contents together with the date-and-time information (ACT 111). Immediately after receiving the exit data, the store server 4 compares the carried-out commodity with the carried-in commodity based on the latest entry data at the time of entering the fitting area 32 (ACT 112). When there is a difference, the store server 4 notifies the entrance and exit gate 6 of an alert instruction instructing an alert (ACT 113). When the alert instruction is received from the store server 4, the entrance and exit gate 6 issues the alert (ACT 114). On the other hand, when there is no difference, the store server 4 transmits, to the entrance and exit gate 6, a status change request for changing the usage state display lamp 703 of the room used by the customer to the off state (ACT 115). The usage state display lamp 703 of the fitting room 7 is turned off in response to the status change request from the store server 4 (ACT 116).

The comparison with the latest carry-in information is not limited to alerting when there is a difference in the result of the comparison of the commodity information, and the alert may also be performed based on a result of another comparison determination, such as determining whether there is a difference in the number of commodities and alerting when there is a difference in the number of commodities.

The member identification information at the time of exiting may be acquired by presenting printout of the destination receipt 631 to the code reader 62. In this case, the member may be identified based on the read fitting room number and the entry data, or information for acquiring the member identification information may be further printed on the destination receipt 631.

In this way, in the store 3, the member identification information is acquired from the membership code displayed on the customer terminal 8 or the membership code attached to the membership card, and the commodity carried into or out of the fitting area 32 is managed for each member. Therefore, even in an off line situation in which communication cannot be performed between the store 3 and the outside, it is possible to prevent misconduct misusing the fitting room 7.

Figure 8:
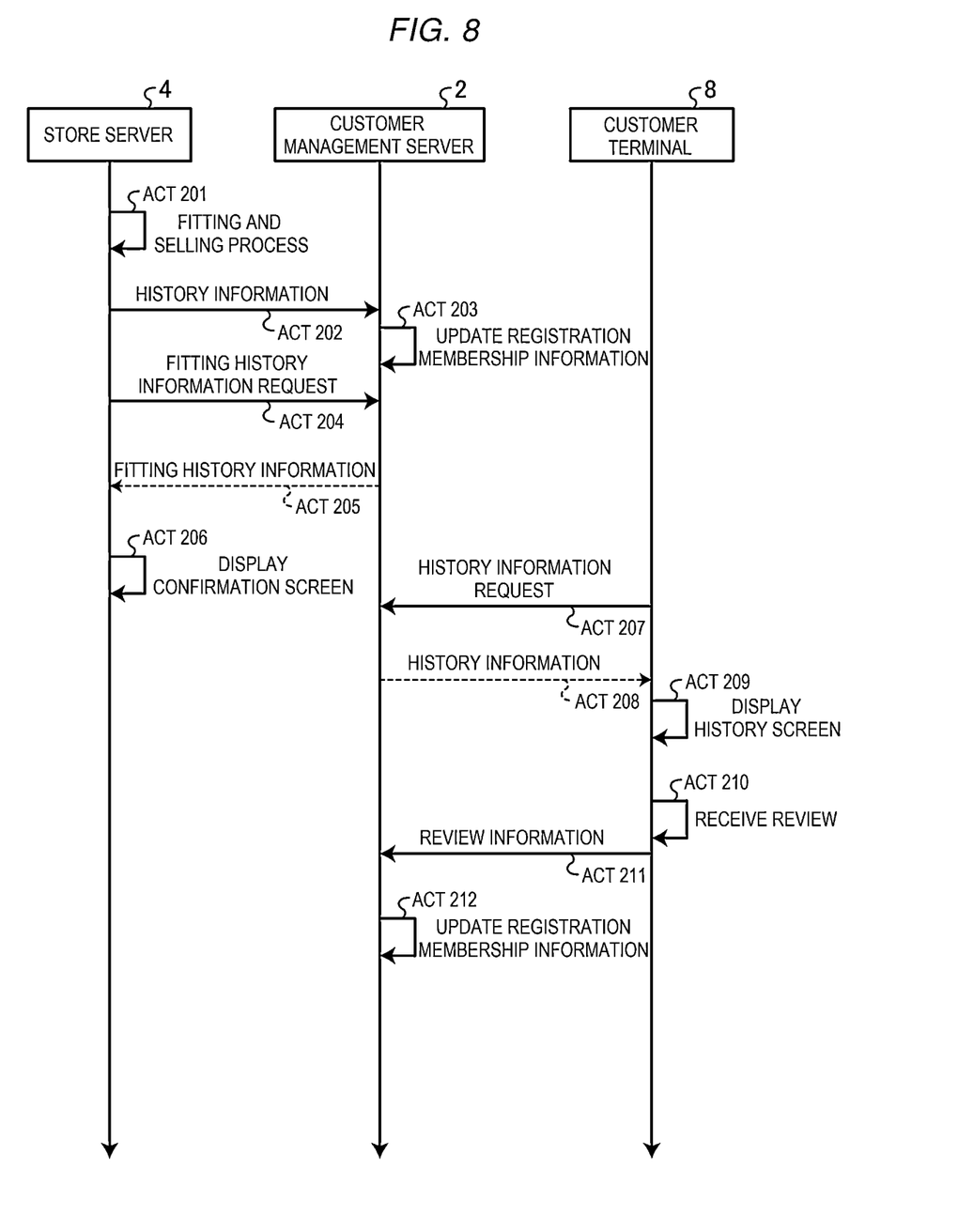
FIG. 8 is a sequence diagram showing an example of a flow of a management process in the information processing system.

FIG. 8 is a sequence diagram showing an example of a flow of a management process in the information processing system 1 according to the embodiment. The flow of the process in FIG. 8 is merely an example, and addition, deletion, and order change of acts may be performed as desired.

After performing the fitting and selling process (ACT 201) as described above with reference to FIG. 7, the store server 4 transmits the using member information 423 including the history information to the customer management server 2 (ACT 202). The customer management server 2 updates the registration membership information 222 of the member based on the history information from the store server 4.

The exit data and information about the alert are further collected and stored as the registration membership information 222 in the customer management server 2. Therefore, even when no misconduct is detected at the time of entering and exiting, misconduct can be traced or verified when the misconduct is found thereafter, such as when the wireless tag is thereafter found to be reattached. For example, the store server 4 transmits, to the customer management server 2, a fitting history information request including at least one of the customer, the date-and-time, and the commodity (ACT 204). The customer management server 2 extracts the corresponding fitting history information in response to the fitting history information request from the store server 4, and transmits the fitting history information to the store server 4 (ACT 205). The store server 4 displays a confirmation screen including the received fitting history information on a display of the store server 4 or the store clerk terminal (ACT 206). In this way, since the history of carrying the commodity into the fitting room 7 continues to be retained by the store 3, a cause can be narrowed down, by tracing the history later, for a malicious act such as replacement of the commodity or detachment of the tag in the fitting room 7. Therefore, according to the above-described configuration, it is possible to expect prevention of misconduct, such as shoplifting or pranks.

The customer can check the fitting history of the purchase history thereof in the member dedicated application and input an individual evaluation related to the commodity indicated by each history. For example, the customer terminal 8 transmits, to the customer management server 2, a history information request including at least one of the store 3, the date-and-time, and the commodity (ACT 207). In response to the history information request from the customer terminal 8, the customer management server 2 extracts the corresponding history information and transmits the history information to the customer terminal 8 (ACT 208). The customer terminal 8 displays a history screen including the received history information on a display of the customer terminal 8 or the like (ACT 209). At this time, the customer terminal 8 can receive the review information 914 indicating a self-evaluation by the customer (ACT 210). When receiving the input of the review information 914, the customer terminal 8 transmits the received review information 914 to the customer management server 2 (ACT 211). The customer management server 2 updates the registration membership information 222 based on the received review information 914 (ACT 212). In this way, according to the configuration in which the customer can view not only the purchase history but also the fitting history with the member dedicated application, an effect of facilitating a future purchase plan is obtained. According to the configuration in which the self-evaluation can be input to the history of each commodity which is purchased and/or fitted, the customer can reconsider a commodity which is rated three or more in a five-stage evaluation but is not purchased among fitted commodities while being outside the store 3, such as at home. According to the above-described configuration, it is possible to expect a sales promotion effect such as increasing the number of touch points of the commodity.

According to the configuration in which the history information collected from each store 3 is stored in association with the member ID 911, a management side of the store 3 can perform various types of analysis related to each commodity, such as whether the commodity is purchased after fitting, whether the commodity is purchased without fitting, whether the commodity is fitted but not purchased, whether the commodity is neither fitted nor purchased, a relationship between the number of times of fitting and purchase or not, and a period between fitting and purchase. According to the configuration in which an attribute of the customer that can be classified from the registration membership information 222, the purchase history, and the fitting history are managed together, study of a sales strategy can be improved. The attribute of the customer is personal information input by the customer at the time of logging into the member dedicated application, and various attributes such as gender, age, residence area, hobby, height, weight, and occupation are considered. At this time, by managing not only the purchase history but also the fitting history, it is conceivable that a sales strategy is established to greatly increase a width of the strategy. That is, according to the analysis of the history information according to the embodiment, an appropriate sales strategy and sales promotion can be studied for each commodity or each customer.

In this way, the information processing system 1 according to the embodiment manages the commodity carried into the fitting room 7 by the customer and the commodity carried out by the customer in association with the membership information, and thus misconduct misusing the fitting room 7 can be prevented in the store 3 where the fitting room 7 is provided, such as an apparel store. In addition, it is possible to reduce time and effort of the store clerk related to management of entering and exiting of the customer into and from the fitting room 7.

According to at least one embodiment described above, it is possible to prevent misconduct behavior of the customer in the store 3 where the fitting room 7 is provided.

In the embodiment described above, "determining whether it is A" may be "determining that it is A", "determining that it is not A", or "determining whether it is A".

Each control program executed by each apparatus in the information processing system 1 according to the embodiment may be provided by being incorporated in a recording medium such as a ROM in advance.

Each control program executed by each apparatus in the information processing system 1 according to the embodiment may be provided by being recorded in a computer-readable recording medium such as a CD-ROM, a flexible disk (FD), a CD-R, or a digital versatile disk (DVD) in a file of an installable format or an executable format.

Further, each control program executed by each apparatus in the information processing system 1 according to the embodiment may be stored in a computer connected to a network such as the Internet and provided by being downloaded via the network. The control program executed by each apparatus in the information processing system 1 according to the embodiment may be provided or distributed via a network such as the Internet.

For example, the control program 221 executed by the customer management server 2 in the embodiment has a module configuration including the above-described units (information collection and storage unit 211). The processor of the control unit 21 reads the control program 221 from the recording medium and loads the above-described units into a main storage apparatus such as the RAM of the control unit 21. Accordingly, the above-described units are generated on the main storage apparatus.

For example, the control program 421 executed by the store server 4 in the embodiment has a module configuration including the above-described units (the fitting room control unit 411, the information collection unit 412, and the notification unit 413). The processor of the control unit 41 reads the control program 421 from the above-described recording medium and loads the above-described units into a main storage apparatus such as the RAM of the control unit 41. Accordingly, the above-described units are generated on the main storage apparatus.

For example, the control program 521 executed by the POS terminal 5 in the embodiment has a module configuration including the above-described units (transaction control unit 511). The processor of the control unit 51 reads the control program 521 from the recording medium and loads the above-described units into a main storage apparatus such as the RAM of the control unit 51. Accordingly, the above-described units are generated on the main storage apparatus.

While certain embodiments have been described, these embodiments have been presented by way of example only, and are not intended to limit the scope of the disclosure. These novel embodiments can be implemented in various other forms, and various omissions, substitutions, and modifications can be made without departing from the gist of the disclosure. The embodiments and the modifications thereof are included in the scope and the gist of the disclosure, and are included in the scope of the disclosure disclosed in the claims and equivalents thereof.

What is claimed is:

1. A system, comprising:
a first reading component configured to read member identification information for uniquely identifying a customer who enters a fitting area and a customer who exits the fitting area, respectively;
a second reading component configured to read at least one piece of commodity identification information at time of entering retained by each wireless tag attached to at least one commodity carried into the fitting area by the customer and at least one piece of commodity information at time of exiting retained by each wireless tag attached to at least one commodity carried out of the fitting area by the customer;
a collection and storage component configured to collect and store, together with date-and-time information, membership information indicated by the member identification information when the customer enters the fitting area in association with commodity information indicated by the commodity identification information at the time of entering, and collect and together store, with date-and-time information, membership information indicated by the member identification information when the customer exits the fitting area in association with commodity information indicated by the commodity identification information at the time of exiting; and
a controller configured to compare, when the customer exits the fitting area, the commodity information at the time of exiting with the commodity information at the time of latest entering, and perform notification when there is a difference between the time of exiting and the time of entering.

2. The system according to claim 1, wherein
the collection and storage component collects and stores, in association with the membership information, purchase history information indicating at least one commodity purchased by the customer and fitting history information indicating at least one commodity carried into the fitting area by the customer.

3. The system according to claim 2, wherein
the collection and storage component receives evaluation information indicating an evaluation of the customer relative to at least one commodity in the fitting history information, and collects and stores the received evaluation information further in association with the membership information.

4. The system according to claim 1, wherein
the controller performs the notification when the customer enters the fitting area and the number of commodities carried into the fitting area by the customer exceeds a predetermined number of commodities.

5. The system according to claim 1, wherein
the first reading component reads the member identification information based on a membership code displayed on an information processing terminal owned by the customer or the membership code attached to a membership card owned by the customer.

6. The system according to claim 1, wherein
the first reading component comprises at least one of an image capturing apparatus, a wireless tag reading, a scanner for optically reading a bar code or a two-dimensional code, and a weight sensor.

7. The system according to claim 1, wherein
the second reading component comprises at least one of an image capturing apparatus, a wireless tag reading, a scanner for optically reading a bar code or a two-dimensional code, and a weight sensor.

8. A method, comprising:
acquiring member identification information for uniquely identifying a customer who enters a fitting area and a customer who exits the fitting area, respectively;
acquiring at least one piece of commodity identification information at time of entering retained by each wireless tag attached to at least one commodity carried into the fitting area by the customer and at least one piece of commodity information at time of exiting retained by each wireless tag attached to at least one commodity carried out of the fitting area by the customer;
collecting and storing, together with date-and-time information, membership information indicated by the member identification information when the customer enters the fitting area in association commodity information indicated by the commodity identification information at the time of entering, and collecting and storing, together with date-and-time information, membership information indicated by the member identification information when the customer exits the fitting area in association with commodity information indicated by the commodity identification information at the time of exiting; and
comparing, when the customer exits the fitting area, the commodity information at the time of exiting with the commodity information at the time of latest entering, and performing notification when there is a difference between the time of exiting and the time of entering.

9. The method according to claim 8, further comprising:
collecting and storing, in association with the membership information, purchase history information indicating at least one commodity purchased by the customer and fitting history information indicating at least one commodity carried into the fitting area by the customer.

10. The method according to claim 9, further comprising:
receiving evaluation information indicating an evaluation of the customer relative to at least one commodity in the fitting history information, and collecting and storing the received evaluation information further in association with the membership information.

11. The method according to claim 8, further comprising:
performing the notification when the customer enters the fitting area and the number of commodities carried into the fitting area by the customer exceeds a predetermined number of commodities.

12. The method according to claim 8, further comprising:
reading the member identification information based on a membership code displayed on an information processing terminal owned by the customer or the membership code attached to a membership card owned by the customer.

13. The method according to claim 8, further comprising:
reading the member identification information using at least one of an image capturing apparatus, a wireless tag reading, a scanner for optically reading a bar code or a two-dimensional code, and a weight sensor.

14. A theft deterrent system, comprising:
a first reading component configured to read member identification information for uniquely identifying a customer who enters a fitting area and a customer who exits the fitting area, respectively;
a second reading component configured to read at least one piece of commodity identification information at time of entering retained by each wireless tag attached to at least one commodity carried into the fitting area by the customer and at least one piece of commodity information at time of exiting retained by each wireless tag attached to at least one commodity carried out of the fitting area by the customer;
a collection and storage component configured to collect and store, together with date-and-time information, membership information indicated by the member identification information when the customer enters the fitting area in association with commodity information indicated by the commodity identification information at the time of entering, and collect and store, together with date-and-time information, membership information indicated by the member identification information when the customer exits the fitting area in association with commodity information indicated by the commodity identification information at the time of exiting; and
a controller configured to compare, when the customer exits the fitting area, the commodity information at the time of exiting with the commodity information at the time of latest entering, and perform notification when there is a difference between the time of exiting and the time of entering.

15. The theft deterrent system according to claim 14, wherein
the collection and storage component collects and stores, in association with the membership information, purchase history information indicating at least one commodity purchased by the customer and fitting history information indicating at least one commodity carried into the fitting area by the customer.

16. The theft deterrent system according to claim 15, wherein
the collection and storage component receives evaluation information indicating an evaluation of the customer relative to at least one commodity in the fitting history information, and collects and stores the received evaluation information further in association with the membership information.

17. The theft deterrent system according to claim 14, wherein
the controller performs the notification when the customer enters the fitting area and the number of commodities carried into the fitting area by the customer exceeds a predetermined number of commodities.

18. The theft deterrent system according to claim 14, wherein
the first reading component reads the member identification information based on a membership code displayed on an information processing terminal owned by the customer or the membership code attached to a membership card owned by the customer.

19. The theft deterrent system according to claim 14, wherein
the first reading component comprises at least one of an image capturing apparatus, a wireless tag reading, a scanner for optically reading a bar code or a two-dimensional code, and a weight sensor.

20. The theft deterrent system according to claim 14, wherein
the second reading component comprises at least one of an image capturing apparatus, a wireless tag reading, a scanner for optically reading a bar code or a two-dimensional code, and a weight sensor.

* * * * *